United States Patent
Barton

(10) Patent No.: US 9,391,334 B2
(45) Date of Patent: Jul. 12, 2016

(54) HYDROGEN GAS GENERATOR

(71) Applicant: Intelligent Energy Inc., San Jose, CA (US)

(72) Inventor: Russell H. Barton, New Westminster, CA (US)

(73) Assignee: Intelligent Energy Inc., San Jose, CA (US)

( * ) Notice: Subject to any disclaimer, the term of this patent is extended or adjusted under 35 U.S.C. 154(b) by 0 days.

(21) Appl. No.: 14/462,408

(22) Filed: Aug. 18, 2014

(65) Prior Publication Data

US 2014/0356742 A1 Dec. 4, 2014

Related U.S. Application Data

(63) Continuation of application No. PCT/US2013/025490, filed on Feb. 11, 2013.

(60) Provisional application No. 61/600,044, filed on Feb. 17, 2012.

(51) Int. Cl.
*H01M 8/06* (2016.01)
*C01B 3/06* (2006.01)
*H01M 8/04* (2016.01)
(Continued)

(52) U.S. Cl.
CPC ............... *H01M 8/0606* (2013.01); *C01B 3/02* (2013.01); *C01B 3/065* (2013.01); *H01M 8/04208* (2013.01); *H01M 8/22* (2013.01); *H01M 8/065* (2013.01); *Y02E 60/362* (2013.01); *Y02E 60/50* (2013.01)

(58) Field of Classification Search
CPC ............ H01M 8/04208; H01M 8/065; H01M 8/0606; C01B 3/02; C01B 3/065

USPC ......................................................... 429/416
See application file for complete search history.

(56) References Cited

U.S. PATENT DOCUMENTS 4,270,360 A 6/1981 Nakane et al.
4,667,815 A 5/1987 Halene
(Continued)

FOREIGN PATENT DOCUMENTS

FR 2950045 3/2011
JP 2010126417 6/2010
WO 2013063169 5/2013

OTHER PUBLICATIONS

International Search Report and Written Opinion dated Jun. 3, 2013, issued in PCT/US2013/025490.

*Primary Examiner* — Jonathan Jelsma
*Assistant Examiner* — Rashid Alam
(74) *Attorney, Agent, or Firm* — Baker & Hostetler LLP

(57) ABSTRACT

A hydrogen generator includes a cartridge including a plurality of thermal conductors each having an outer wall assembled together to form a housing. A plurality of fuel pellets provided on the plurality of thermal conductors. Each fuel pellet has a hydrogen-containing reactant that will react to release hydrogen gas when heated. The hydrogen generator also includes a compartment configured to removably contain the cartridge. The hydrogen generator further includes a plurality of heating elements disposed in the compartment such that each heating element is in thermal communication with one of the thermal conductors when the cartridge is disposed within the compartment to generate heat to selectively heat one or more fuel pellets to initiate a reaction to produce hydrogen gas.

14 Claims, 5 Drawing Sheets

(51) Int. Cl.
*C01B 3/02* (2006.01)
*H01M 8/22* (2006.01)

(56) References Cited

U.S. PATENT DOCUMENTS

| | | | |
|---|---|---|---|
| 5,797,269 A | 8/1998 | Nishimura et al. | |
| 6,318,453 B1 | 11/2001 | Ovshinsky et al. | |
| 6,478,077 B1 | 11/2002 | Story et al. | |
| 6,878,353 B2 | 4/2005 | Ovshinsky et al. | |
| 6,892,798 B2 | 5/2005 | Lee et al. | |
| 6,991,770 B2 | 1/2006 | Suzuki et al. | |
| 6,997,242 B2 | 2/2006 | Fujita et al. | |
| 7,052,658 B2 | 5/2006 | Arthur et al. | |
| 7,682,411 B2 | 3/2010 | Jones et al. | |
| 2007/0011251 A1 | 1/2007 | McNamara et al. | |
| 2009/0017348 A1 | 1/2009 | Kelly et al. | |
| 2009/0092866 A1 | 4/2009 | Ibuka et al. | |
| 2010/0247425 A1* | 9/2010 | Scattergood | B01J 8/0496 423/648.1 |
| 2010/0247750 A1 | 9/2010 | Eickhoff | |
| 2010/0248056 A1 | 9/2010 | Yaguchi | |
| 2011/0076228 A1 | 3/2011 | Kelly et al. | |

* cited by examiner

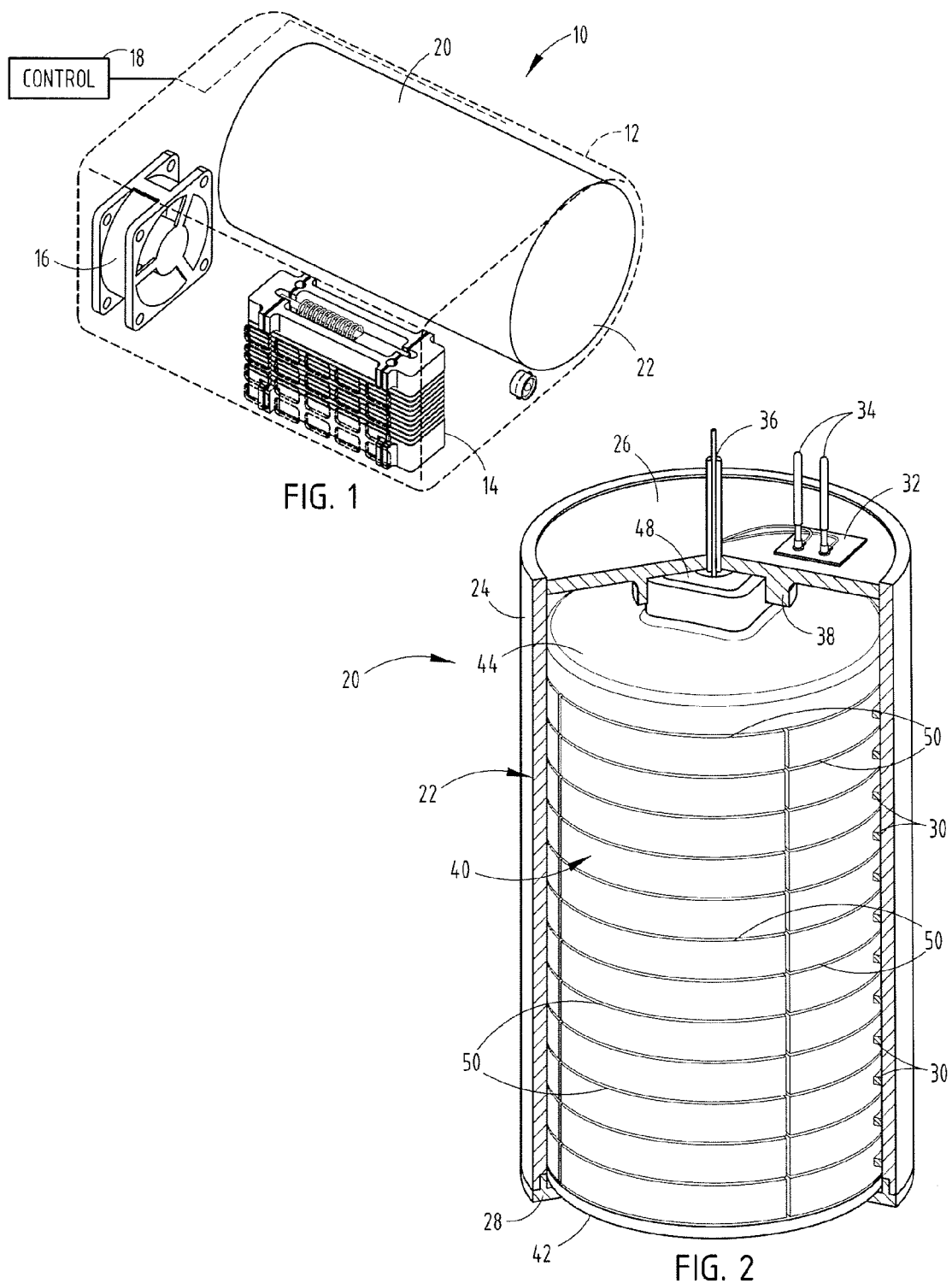

HYDROGEN GAS GENERATOR

CROSS-REFERENCE TO RELATED APPLICATIONS

This application is a Continuation Application of International patent application PCT/US2013/025490, filed on Feb. 11, 2013, which claims priority to United States provisional patent application No. 61/600,044, filed on Feb. 17, 2012, the disclosures of which are incorporated by reference in their entirety.

FIELD OF THE INVENTION

The present invention generally relates to a hydrogen gas generator, and more particularly relates to a hydrogen generator for providing hydrogen gas to a fuel cell system.

BACKGROUND OF THE INVENTION

Interest in fuel cell batteries as power sources for portable electronic devices has grown. A fuel cell is an electrochemical cell that uses materials from outside the cell as the active materials for the positive and negative electrodes. Because a fuel cell does not have to contain all of the active materials used to generate electricity, the fuel cell can be made with a small volume relative to the amount of electrical energy produced compared to other types of batteries.

Fuel cells can be categorized according to the types of materials used in the positive electrode (cathode) and negative electrode (anode) reactions. One category of fuel cell is a hydrogen fuel cell using hydrogen as the negative electrode active material and oxygen as the positive electrode active material. When such a fuel cell is discharged, hydrogen is oxidized at the negative electrode to produce hydrogen ions and electrons. The hydrogen ions pass through an electrically nonconductive, ion permeable separator and the electrons pass through an external circuit to the positive electrode, where oxygen is reduced.

In some types of hydrogen fuel cells, hydrogen is formed from a fuel supplied to the positive electrode side of the fuel cell, and hydrogen is produced from the supplied fuel. In other types of hydrogen fuel cells, hydrogen gas is supplied to the fuel cell from a source outside the fuel cell. A fuel cell system can include a fuel cell battery, including one or more fuel cells (such as a fuel cell stack), and a hydrogen source, such as a fuel tank, a hydrogen tank or a hydrogen gas generator. Gas generators that supply gas to a fuel cell can be an integral part of the fuel cell system, they can be removably coupled to the fuel cell system, or they can include replaceable components containing reactants. A removable gas generator can be replaced with another one when the gas producing reactants have been consumed. Removable gas generators can be disposable (intended for only a one-time use) or refillable (intended for use multiple times) to replace consumed reactant materials.

A hydrogen gas generator uses one or more reactants containing hydrogen that can react to produce hydrogen gas. Hydrogen generators can produce hydrogen using a variety of reactants and a variety of methods for initiating the hydrogen generating reactants. The reaction can be initiated in various ways, such as hydrolysis and thermolysis. For example, two reactants can produce hydrogen and byproducts. Examples of hydrogen-containing materials include liquid or gaseous hydrocarbons (such as methanol), hydrides (such as metal hydrides and chemical hydrides), alkali metal silicides, metal/silica gels, water, alcohols, dilute acids, and organic fuels (such as N-ethylcarbazon and perhydrofluorene). A hydrogen-containing compound can react with another reactant to produce hydrogen gas when the reactants are mixed together, in the presence of a catalyst, heat or an acid, or a combination thereof. A hydrogen-containing compound can be heated to evolve hydrogen in a thermochemical decomposition reaction.

In selecting reactants for use in a hydrogen generator, consideration may be given to the following: (a) stability during long periods of time when the hydrogen generator is not in use, (b) ease of initiation of a hydrogen generating reaction, (c) the amount of energy that must be provided to sustain the hydrogen generating reaction, (d) the maximum operating temperature of the hydrogen generating reaction, and (e) the total volume of hydrogen that can be produced per unit of volume and per unit of mass of the reactant(s).

In order to provide hydrogen over a long period of time without developing a very high pressure within the hydrogen generator, it is desirable to generate the hydrogen on an as-needed basis. This requires controlling the reaction of the reactant(s), such as by reacting only a limited quantity at a time.

It is desirable to provide a hydrogen generator capable of supplying hydrogen gas to a fuel cell stack that has one or more of the following features: capable providing a large total volume of hydrogen gas per unit of mass and per unit of volume of the hydrogen generator, capable of controlling the reaction of the reactant(s) to efficiently provide hydrogen on an as-needed basis without producing an excessive internal pressure within the hydrogen generator, able to operate at or below a desired maximum temperature, all or a portion of the hydrogen generator in a fuel cell system can be replaced after reactants have been consumed, long-term durability and reliability and easy and economic manufacturing.

SUMMARY OF THE INVENTION

According to one aspect of the present invention, a hydrogen gas generator is provided. The hydrogen generator includes a cartridge including a plurality of thermal conductors each having an outer wall assembled together to form a housing. A plurality of fuel pellets are provided on the plurality of thermal conductors. Each fuel pellet has a hydrogen-containing reactant that will react to release hydrogen gas when heated. The hydrogen generator also includes a compartment configured to removably contain the cartridge. The hydrogen generator further includes a plurality of heating elements disposed in the compartment such that each heating element is in thermal communication with one of the thermal conductors when the cartridge is disposed within the compartment to generate heat to selectively heat one or more fuel pellets to initiate a reaction to produce hydrogen gas. Embodiments can include one or more of the following features:
  each thermal conductor includes a radial extending member in thermal communication with the outer wall; each thermal conductor can be in direct contact with the outer wall;
  the cartridge includes one or more seals disposed between adjacent thermal conductors;
  the cartridge includes an insulation layer disposed between adjacent fuel pellets;
  the fuel pellet is formed on both sides of the thermal conductor;
  each thermal conductor includes one or more openings through which the fuel pellet extends;

the cartridge includes a hydrogen outlet valve in the housing and a hydrogen flow path from each fuel pellet to a hydrogen outlet path;

the cartridge includes a bottom end and a top end sealed to the plurality of thermal conductors;

the heating system has heating elements that include electric heating elements;

the hydrogen generator includes a controller for controlling actuation of the heating system to selectively heat one or more fuel pellets a time;

the compartment has a side wall, wherein the plurality of heating elements are disposed on an inside surface of the side wall;

the compartment side wall may be cylindrical and the cartridge has an outer cylindrical wall;

the cartridge is configured to be disassembled to remove the plurality of thermal conductors when the plurality of fuel pellets have been consumed and to be reassembled with a plurality of thermal conductors having a fresh plurality of fuel pellets; and the hydrogen generator is adapted to be coupled to a fuel cell to supply hydrogen to the fuel cell.

According to another aspect of the present invention, a hydrogen generator cartridge includes a plurality of thermal conductors each having an outer wall assembled together to form a housing. The hydrogen generator cartridge also includes a plurality of fuel pellets provided on the plurality of thermal conductors. Each fuel pellet includes a hydrogen-containing reactant that will react to release hydrogen gas when heated. The cartridge is configured to be placed in thermal communication with a heating system to selectively heat one or more fuel pellets to initiate a reaction to produce hydrogen gas.

According to a further aspect of the present invention, a fuel cell system is provided. The fuel cell system includes a fuel cell having a hydrogen gas input. The fuel cell system includes a hydrogen generator. The hydrogen generator includes a cartridge having a plurality of thermal conductors each having an outer wall assembled together to form a housing. The hydrogen generator also includes a plurality of fuel pellets provided on the plurality of thermal conductors. Each fuel pellet includes a hydrogen-containing reactant that will react to release hydrogen gas when heated. The cartridge includes a compartment configured to removably contain the cartridge. The hydrogen generator further includes a heating system having a plurality of heating elements disposed in the compartment such that each heating element is in thermal communication with one of the thermal conductors when the cartridge is disposed within the compartment to generate heat to selectively heat one or more fuel pellets to initiate a reaction to produce hydrogen gas.

Unless otherwise specified herein, all disclosed characteristics and ranges are as determined at room temperature (20-25° C.).

These and other advantages of the invention will be further understood and appreciated by those skilled in the art by reference to the following written specification, claims, and appended drawings.

BRIEF DESCRIPTION OF THE DRAWINGS

In the drawings:

FIG. 1 is a perspective view of a fuel cell system employing a hydrogen generator, according to one embodiment;

FIG. 2 is a partial sectional perspective view of a hydrogen generator employing a cartridge employing a stack of thermal conductors and fuel pellets, according to one embodiment;

DETAILED DESCRIPTION OF THE PREFERRED EMBODIMENTS

Figure 3:
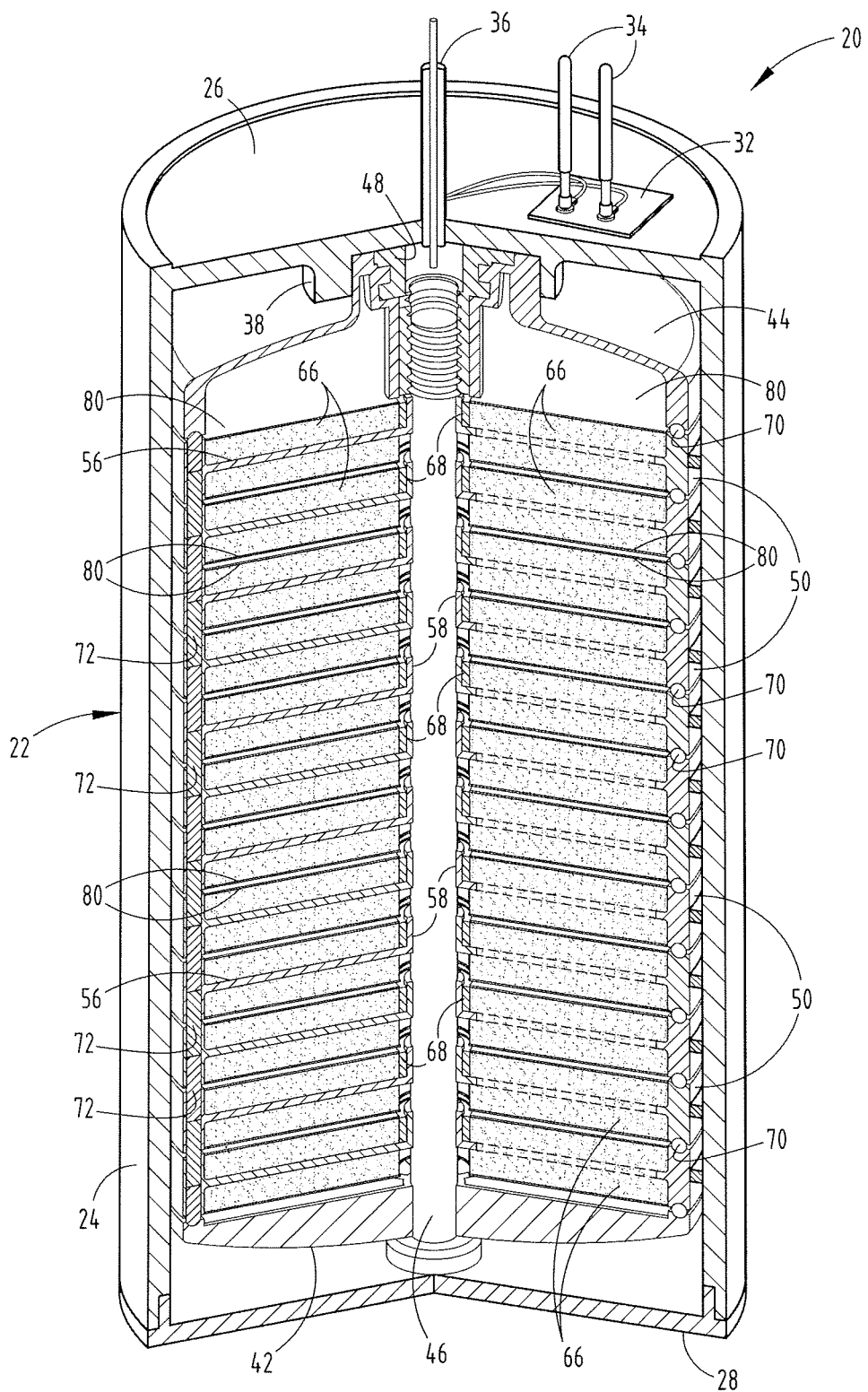
FIG. 3 is a cross-sectional view of the hydrogen generator further illustrating the stack of fuel pellets.

A hydrogen generator that produces hydrogen gas and a fuel cell system that employs the hydrogen generator are disclosed. The hydrogen gas generated by the hydrogen generator can be used by a hydrogen consuming system, such as the fuel cell system including a fuel cell stack that produces electricity for an electronic device. The hydrogen generator includes a cartridge and a receiving compartment configured to removably receive or contain the cartridge. The cartridge may be a replaceable cartridge that may be removably inserted within the compartment. The hydrogen generator can be re-used at a minimum added expense by replacing the cartridge in which the reactants are contained. The cartridge can be disposed of after use, and can be re-used by refilling it with fresh reactants, or the cartridge or a portion of it can be recycled. The size and shape of the cartridge and the compartment can be varied depending on the circumstances. For example, the cartridge can have a generally cylindrical shape, or it can have a generally prismatic shape.

The cartridge has a plurality of thermal conductors, each having an outer wall arranged to form a housing with a seal disposed between adjacent thermal conductors. Each thermal conductor has a radially extending member in thermal communication with the outer wall. The cartridge also includes a plurality of fuel pellets including a hydrogen-containing reactant that will react to release hydrogen gas when heated. Each fuel pellet is embedded on a thermal conductor such that heat applied to the thermal conductor will be conducted to the hydrogen-containing reactant such that it reacts to release hydrogen gas. The plurality of thermal conductors are stacked in relation to one another with seals in between each layer and between thermal conductors within the same layer so as to form a sealed housing or casing containing the reactant. The housing is provided as a cartridge that may be handled and installed within the compartment of the hydrogen generator. The cartridge also includes an outlet in the casing and a hydrogen flow path from each fuel pellet to a hydrogen outlet path. The hydrogen generator may be used in a fuel cell system to supply generated hydrogen on an as needed basis to a fuel cell.

The hydrogen generator further includes a heating system including a plurality of heating elements disposed on an inside surface of the compartment such that each heating element is in thermal communication with one of the thermal conductors when a cartridge is disposed within the cavity to generate heat to selectively heat one or more pellets to initiate a reaction to produce hydrogen gas. Thus, the heating elements deliver heat to the thermal conductors, which in turn heat the reactant to release hydrogen gas when heated. The heater elements may selectively activate to heat one or more fuel pellets at a time or a desired selection process may be employed to generate the necessary amount of hydrogen and to control the temperature and heat distribution within the housing.

One or more reactants are contained in a solid composition that is formed into a fuel pellet disposed on one or more surfaces of the thermal conductor. In one embodiment, the reactant is formed as a fuel pellet on both top (first) and bottom (second) surfaces of the thermal conductor, and further is disposed within openings provided in the thermal conductor that extend through the top and bottom opposite surfaces. The reactant may be press fit as a fuel pellet onto the thermal conductor. The formation of the fuel pellet may include a simple process, such as molding, extruding, depositing, coating, printing, and so on. In one embodiment, the thermal conductor and fuel pellet is pre-shaped as a partial disc, such as one-quarter of a disc, so that multiple thermal conductors and fuel pellets are provided on each layer and multiple layers of stacked thermal conductors and fuel pellets are provided. The size of the fuel pellet, including the height, the width, and length, can be chosen to provide a desired quantity of hydrogen, based on the size of the fuel cell stack and the power requirements of the electronic device, as well as the volume available in the hydrogen generator.

The solid bodies containing the reactant can be in various forms, such as tablets, wafers, cakes, briquettes, coatings, and so on, all referred to herein as fuel pellets. Reactants and optional components of the solid composition are described below. The solid bodies can have various shapes, such as circles, ovals, squares, triangles, trapezoids, wedges, irregular shapes, and so on. The solid bodies can be made using a suitable process, such as molding, extruding, depositing, briquetting, coating, printing, and so on. As used below, the term "pellet" refers to a solid body of the reactant, and is not limited to a particular form, shape, or method of manufacture, unless otherwise stated. The pellets can be sized and shaped to fit into the cartridge in a volume-efficient manner. The pellet size and composition can be chosen to provide a desired quantity of hydrogen from each pellet, based on the size of the fuel cell stack and the power requirements of the electronic device, for example.

The thermal conductor has an upstanding outer end wall that forms a portion of the housing of the cartridge. Multiple outer walls are assembled together with seals and end plates to form a sealed housing. Extending from the upstanding outer wall of each thermal conductor is a radial plate that extends orthogonal to the upstanding wall. The radial plate can have openings extending therethrough between the top and bottom surfaces. The reactant is press fit as a pellet onto the plate on one or both sides of the plate and can extend through the openings. Heat transferred to an outside surface of the upstanding outer wall thermally conducts to the plate, which covers a substantial portion of the reactant to heat the reactant to generate hydrogen.

The thermal conductors and fuel pellets are stacked one layer on top of another and isolated from one another via an insulation layer to provide thermal insulation between adjacent layers. Thermal conductors and fuel pellets within the same layer are spaced from one another to provide thermal isolation and allow gas to flow therebetween. Additionally, thermal insulation may be provided between adjacent pellets within a given layer to isolate one fuel pellet within a layer from another fuel pellet. As such, individual fuel pellets may be heated to generate hydrogen, while thermally isolating the fuel pellet from adjacent fuel pellets so that unintended initiation of a reaction in one pellet as a result of heat transfer from an adjacent pellet is prevented.

The reactant in the fuel pellets contains elemental hydrogen that is released as hydrogen gas when the fuel pellet is heated sufficiently by way of a heater. The hydrogen gas produced by this reaction travels through a hydrogen flow path from the reactant to a hydrogen outlet in the casing or housing. The hydrogen outlet can include a valve.

At least one hydrogen-containing reactant is included in each fuel pellet. More than one reactant can be included. Examples of reactants that can evolve hydrogen gas upon thermal decomposition include: lithium idide ($Li_2NH$), lithium amide ($LiNH_2$), an ammonium halide (e.g., $NH_4F$, $NH_4Cl$ or $N_2H_6Cl_2$) plus a chemical hydride (e.g., $LiH$, $LiBH_4$, $NaBH_4$, $LiAlH_4$ or $NaAlH_4$), alane ($AlH_3$), ammonia borane ($NH_3BH_3$), ammonia borane plus a chemical hydride (e.g., alane or a boron hydrazine complex such as hydrazine bisborane ($N_2H_4(BH_3)_2$)), ammonium nitrate ($NH_4NO_3$) plus diammonium decaborane ($B_{10}H_{10}(NH_4)_2$), sodium boronydride, alanates, e.g., sodium alanate ($NaAlH_4$) and other materials, such as grapheme and carbon nanotubes with hydrogen inserted therein.

The hydrogen-containing reactant can also contain one or more additives. Examples of additives include binders (e.g., acrylates and styrene block copolymers), stabilizing compounds (e.g., solid bases), reaction accelerators (e.g., solid acids), catalysts (e.g., $Fe_2O_3$, $TiCl_3$), ignition materials as described below, thermally conductive materials (e.g., metals, graphites and combinations and composites thereof), and so on. Rubber cement may be added to the reactant as a binder (e.g., 50%) to hold the reactant together as the feed member flexes.

The heating system heats the outer upstanding wall of one or more of the thermal conductors. The thermal energy conducts through the plate of each conductor and into the reactant to result in a thermal decomposition reaction of the hydrogen-containing reactant. The heating system can include a plurality of heating elements, one heating element for each fuel pellet, according to one embodiment. Multiple heaters can advantageously be activated simultaneously to heat multiple pellets at one time, when more hydrogen is required. Various types of heaters can be used. Examples of heaters include resistive heaters, inductive heaters, infrared heaters, laser heaters, microwave heaters, semi-conductive bridges, and so on.

The reactant of each fuel pellet is disposed on a thermal conductor. More than one thermal conductor can be used to transfer heat to a single pellet. More than one pellet can share the same thermal conductor (e.g., so more than one pellet can be heated at a time with a given thermal conductor).

The thermal conductors are made from a material with good thermal conductivity and capable of withstanding high temperatures. The resulting cartridge is capable of remaining sealed during use. Suitable materials for the thermal conductor include graphite, heat pipes, and metals, such as aluminum, copper, silver, and stainless steel. Aluminum can work well as the metal for the thermal conductor because of its high thermal conductivity and relatively low cost. The thermal conductor can be a multi-layer material. For example, it can include a layer of the metal (e.g., aluminum) with a coating of a material with a very high thermal conductivity, such as pyrolitic carbon, between the metal and the pellet solid composition.

In hydrogen generators where a metal compound in the pellet composition is reduced to a metal with a high thermal conductivity (e.g., the reduction of alane to aluminum metal), it may be possible to reduce the size of the thermal conductor and heat contact with the pellet reactant if the metal produced will function as a part of the thermal conductor. This can make more space available for reactants and maintain good heat transfer to the reactants during use of the hydrogen generator.

The thermal conductor can be the sole means of applying heat to the reactant, or an ignition material (a material that will react exothermically, producing heat for the thermal decomposition reaction of the hydrogen-containing reactant) can be included in the pellet, such as in a mixture with the reactant or as a separate layer or portion of the pellet. If the thermal decomposition reaction of the reactant generates heat, it may be possible to reduce or stop applying heat after the reaction is initiated. An ignition material can be used to supplement or replace the application of more heat by the heating elements, thereby reducing the amount of energy consumed by the hydrogen generator. Examples of ignition materials (some of which can also contribute to the hydrogen yield) include iron powder or $TiH_2$ plus $KClO_4$, $MnO_2$ plus $LiAlH_4$, Ni plus Al, Zr plus $PbCrO_4$, $Fe_2O_3$ plus Al (thermite), and $LiAlH_4$ plus $NH_4Cl$.

The fuel pellets can be arranged within the cartridge in a variety of ways. For example, the plurality of fuel pellets can be arranged in a single layer or in multiple layers with each layer containing one or more than one fuel pellet. Factors such as size and shape of the cartridge, compartment, and hydrogen generator, the volume of hydrogen to be produced by a single cartridge, and simplicity of the heating system can be considered in selecting a pellet arrangement. For example, if the layers are relatively large, it may be desirable to include multiple pellets on each layer in order to enable hydrogen production at a slower rate, while if the layers are relatively small, it may be desirable to have fewer pellets or only a single pellet on each layer to minimize the amount of thermal insulation required between adjacent pellets.

While it may be desirable to react more than one fuel pellet at a time, in order to prevent the uncontrolled initiation of reactions in adjacent pellets, it is desirable for individual pellets or groups of pellets to be thermally insulated from one another. This can be accomplished in various ways, including spacing pellets apart from each other, separating pellet layers with thermally insulated material (e.g., sheets or layers of thermally insulating material), placing thermal insulation between adjacent pellets or layers of pellets (e.g., containers or coatings made of thermally insulating material), and so on. Suitable thermal insulator materials include silica, silicon dioxide, silicon nitrides, silicon carbide, silica aerogel, alumina, alumina oxide, glass, glass wool, mineral wool, cellular glass, perlite, and polymers, such as polyimides and epoxy-amine composites.

The heating elements are disposed on an inside surface of the compartment. The surface, which can be a surface of a side wall, a lid, or a door, defines a portion of a cavity into which the cartridge can be inserted. When the cartridge is inserted in the receiving compartment, the cartridge and compartment are positioned such that each heating element is in thermal communication with an outer wall of a thermal conductor. The heating elements may be aligned in contact with the thermal conductors. The heating elements and the aligned outer wall of the thermal conductors are therefore directly opposite each other. There can be a path with high thermal conductivity between the heating elements and the thermal conductors to allow heat transfer. Each thermal conductor can be supplied with heat from a single heating element, one heating element can be used to supply heat to more than one thermal conductor, or multiple heating elements can supply heat to a single thermal conductor. Because the cartridge is removable from the hydrogen generator, insertion and removal of the cartridge can be facilitated if contact between the heating elements and the cartridge is pressure contact. Examples of suitable types of heating elements include resistive heating elements. Resistive heating elements can be wire, ribbon, or a strip with high resistance. Suitable materials include metals and alloys (e.g., nickel-chromium alloys, iron-chromium-aluminum alloys, copper-nickel alloys, and other types of alloys), intermetallic compounds (e.g., molybdenum, disilicides), and metal ceramics.

The compartment may be made of a material that can withstand the temperatures and pressures to which it may be exposed. It can be a poor conductor of heat in order to protect other components of a system, as well as a user, from damaging or dangerous temperatures. Thermal and/or electrical insulation can be added. Examples of suitable materials for the compartment include metals such as aluminum, steel, stainless steel, and so on, or high temperature resistant ceramics and polymeric materials.

When the cartridge is inserted into the compartment, it must be positioned so the heating elements are properly aligned with the thermal conductors. This can be accomplished by a cooperation between the cartridge and the compartment. For example, the cartridge and the component can be keyed (e.g., portions of the cartridge and compartment mate with each other), as a key mates with a lock, only when the cartridge and the compartment are positioned relative to one another such that the heating elements and thermal conductors are properly aligned).

In one embodiment, the cartridge has a stack of thermal conductors arranged one row on top of another, each row having four thermal conductors with fuel pellets press fit thereon. Each thermal conductor is pie-shaped, covering an angle of approximately ninety degrees (90°) of a given layer, according to one embodiment. The heating system includes four columns of heating elements, each configured to align with a corresponding thermal conductor, such that four heating elements are placed equiangularly at 90 degrees about each row to make contact or thermal communication with corresponding thermal conductors. According to another embodiment, a single column of heating elements may be employed and the cartridge may be rotated about the longitudinal axes so as to place one column of thermal conductors in thermal communication with the heating elements. Movement of the cartridge may be achieved by employing a motor or a manually operated mechanism to rotate the cartridge.

If the heating elements on the inner surface of the compartment are in pressure contact with the outer surface of the cartridge, the heating elements can include spring-like elements that will allow easy insertion and removal of the cartridge into the compartment. Alternatively, the compartment can be oversized relative to the cartridge casing and reduced in size after cartridge insertion and increased in size for cartridge removal. This can be accomplished in a variety of ways. For example, the compartment can have long segments separated by spaces, similar to a collet chuck, that form a collar around the inserted cartridge, and another device that can be used to tighten and loosen the segments. In another example, the compartment can be split along its length and be tightened with a clamping device similar to a piston ring compressor or a radiator hose clamp. Alternatively, the compartment can be a split spring-like device similar to a tolerance ring that is enlarged as the cartridge is inserted and biases the housing against the inserted cartridge.

The heating system and thermal conductors selectively heat one or more pellets at a time to generate a desired quantity of hydrogen gas. This is achieved by applying current to the desired heating element(s) such that the heating element becomes hot and heat is transferred from the heating element through the upstanding outer wall of the thermal conductor through the thermal conductor plate and then to the fuel pellet solid composition. The current source can be a battery, fuel cell, or other source of electrical energy within the hydrogen generator, elsewhere in the system, or even outside the system (e.g., within a device being supplied with power from a fuel cell stack in the system).

A control system can be used to control the hydrogen generator. Operation of the control system, the heating system or both can be controlled in various ways. The control system can determine the need for hydrogen by monitoring the pressure within the fuel cell system, one or more electrical characteristics of the fuel cell stack, or one or more electrical characteristics of the electronic device, for example. The controller may communicate with the device or the fuel cell stack to determine when more hydrogen is needed. The control system can be completely or partially disposed in the hydrogen generator, the fuel cell stack, the electronic device being powered by the fuel cell stack, or any combination thereof. The control system can include a microprocessor or micro controller; digital, analog and/or hydride circuitry; solid state and/or electromechanical switching devices; capacitors, sensing instrumentation, and so on. The control system can control application of the heaters to heat selected fuel pellets one or more at a time. The control system may heat fuel pellets remote from one another so as to spread out the heat generation within the cartridge.

The hydrogen flow path can include a channel extending through or around the pellets or pellet layers. The channel can be a central channel, for example. Multiple channels can be present.

The hydrogen generator can include various filters and/or purification units to remove undesired reaction byproducts and other contaminants from the hydrogen gas.

The hydrogen generator can also include various fittings, valves and electrical connections for providing hydrogen to and interfacing with the fuel cell stack and/or an electrical appliance being provided with power by the fuel cell system.

The hydrogen generator can include various safety features such as a pressure relief vent to release excessive pressure and a mechanism to stop the feeding of the flexible feed member to the ignition system if the internal temperature exceeds an established limit.

Referring to FIG. 1, a fuel cell system 10 is generally shown arranged within a fuel cell system housing 12. The fuel cell system housing 12 may include a fuel cell compartment provided in an electrically powered device, such as a computer. The fuel cell system 10 includes a fuel cell 14 also referred to herein as a fuel cell stack. The fuel cell stack 14 has a hydrogen gas input (not shown) to receive and consume hydrogen gas to generate electricity which, in turn, may be supplied to the electrically powered device. The fuel cell stack 14 generally includes a stack of fuel cells each having positive and negative electrodes as is generally known in the fuel cell art. The hydrogen gas may be used as the negative electrode active material and oxygen may be used as the positive electrode active material.

Figure 4:
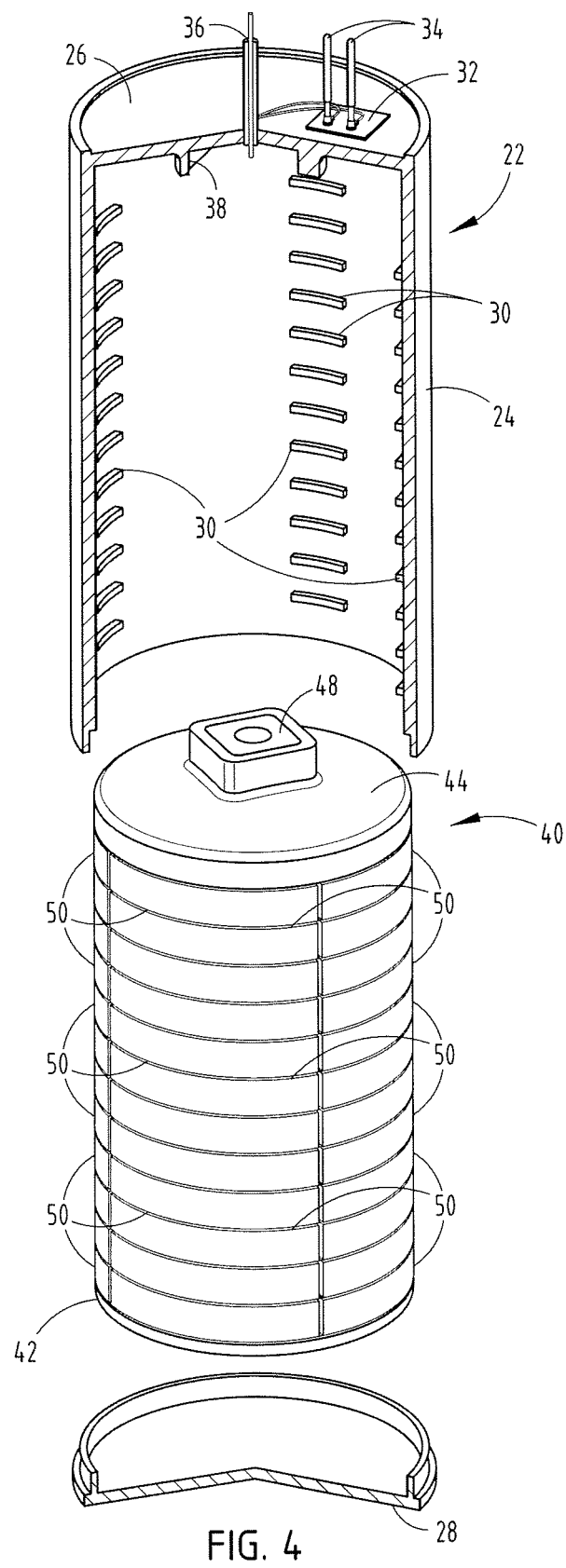
FIG. 4 is a partial sectional view of the hydrogen generator showing the cartridge removed from the compartment and heater assembly.

The fuel cell system 10 also includes a hydrogen generator 20 having a compartment 22 with a size and shape configured to receive a hydrogen generator cartridge 40. The hydrogen generator compartment 22 is shown disposed within a fuel cell compartment 12. The hydrogen generator 20 is shown in FIGS. 2-4 having a cartridge 40 assembled within compartment 22 for generating and supplying hydrogen gas to the fuel cell stack 14. The hydrogen gas input can receive hydrogen gas from the hydrogen generator 20 via a fluid coupling path (not shown). While a generally cylindrical shaped hydrogen generator 20 is shown and described in connection with FIGS. 1-4, it should be appreciated that the hydrogen generator 20 may have other shapes and sizes as should be evident to those skilled in the art. The cartridge 40 may be replaceable, such that a used hydrogen generator cartridge 40 may be removed from compartment 22 and a new hydrogen generator cartridge 40 installed therein to generate a fresh supply of hydrogen gas for the fuel cell 14.

In addition, a controller 18 is illustrated coupled to or included in the fuel cell system 10. The controller 18 may control the hydrogen generator 20 and its generation of hydrogen as desired to meet the needs of the fuel cell stack 14 to provide sufficient electrical power. It should be appreciated that the controller 18 may be located within the fuel cell housing 12 or elsewhere within the fuel cell system 10 or the electrical device employing the fuel cell system 10. It should further be appreciated that the controller 18 could be located within the hydrogen generator 20 or fuel cell stack 14, according to other embodiments. The fuel cell system 10 also includes a cooling fan 16 for cooling the fuel cell stack 14. The fuel cell system may further include a motor or other actuator to rotate the cartridge 40 relative to compartment 22, according to another embodiment.

FIGS. 2-4 illustrate one embodiment of a hydrogen generator 20. The hydrogen generator 20 includes the compartment 22 generally shown having a cylindrical side wall with a closed top end 26 and a removable bottom end or lid 28. The hydrogen generator 20 may be configured with compartment 22 assembled into a fuel cell receptacle and a cartridge removably inserted into the compartment 22 to generate hydrogen gas and supply the generated hydrogen gas to a fuel cell 14. The hydrogen generator 20 may employ a fixed compartment 22 and the cartridge 40 is removable from the fixed compartment 22. The size and shape of the hydrogen generator 20 and its receiving compartment 22 can be varied. In FIGS. 2 and 3, the cartridge 40 is shown inserted into the compartment 22, and in FIG. 4, the cartridge 40 is shown removed from the compartment 22. Cartridge 40 includes a rectangular or keyed member shown as a square key formed into a hydrogen outlet valve 48 extending from a top end, which when properly oriented within compartment 22, fits within square receptacle 38 to properly position the cartridge 40 in the compartment 22 relative to heating elements.

The hydrogen generator 20 includes a heating system having a plurality of heating elements 30 disposed on an inside surface of the compartment 22. Each of the heating elements 30 is in thermal communication with the outer wall of one of the thermal conductors when the cartridge 40 is disposed within the compartment 22. The heating elements 30 generate heat to selectively heat one or more fuel pellets to initiate a reaction to produce hydrogen gas. The heating elements 30 may be in direct contact with the outer wall of the individual thermal conductors of cartridge 40, according to one embodiment. The heating elements 30 align in thermal communication with the thermal conductors of the cartridge 40. In the example shown, four columns of heating elements 30 are arranged equiangularly at approximately ninety degree) (90° spacings extending radially inward from the inner surface of the side wall of compartment 22. Each heating element 30 may be selectively controlled via the controller to heat a corresponding thermal conductor to heat a fuel pellet associated therewith to thereby generate hydrogen gas. It should be appreciated that more or less heating elements 30 may be employed. According to another embodiment, one column of heating elements 30 may be employed and the cartridge 40 may be rotated via a motor or other actuator relative to compartment 22 so as to orient one column of thermal conductors and fuel pellets in thermal communication with the column of heating elements 30, one column at a time.

The hydrogen generator 20 also includes electrical circuitry 32 provided on the top closed end of compartment 22 to carry electrical current to selected heating elements 30 to heat selected thermal conductors and cause the fuel pellet solid reactant composition to react. The source of the electric current can be outside the hydrogen generator 20. External electrical contacts 34 contact with the electrical circuitry 32 to provide electrical current from the electrical source to the circuitry 32.

Additionally, the cartridge 40 is shown having the hydrogen outlet valve 48 generally sealed to the top end 26. When the cartridge 40 is installed in compartment 22, the hydrogen outlet valve 48 can be coupled to the remainder of the fuel cell system. The hydrogen outlet valve 48 can be recessed within compartment 22 and accessed through an opening in the top end 26. The hydrogen outlet valve 48 can extend through the opening to the outside of the hydrogen generator 20, or the hydrogen outlet valve 48 can mate with a coupling 36 in the opening of the compartment top end 26. As such, the supply of hydrogen gas may exit the hydrogen generator 20 and pass in fluid communication from coupling 36 to a gas inlet port of a fuel cell.

Figure 5:
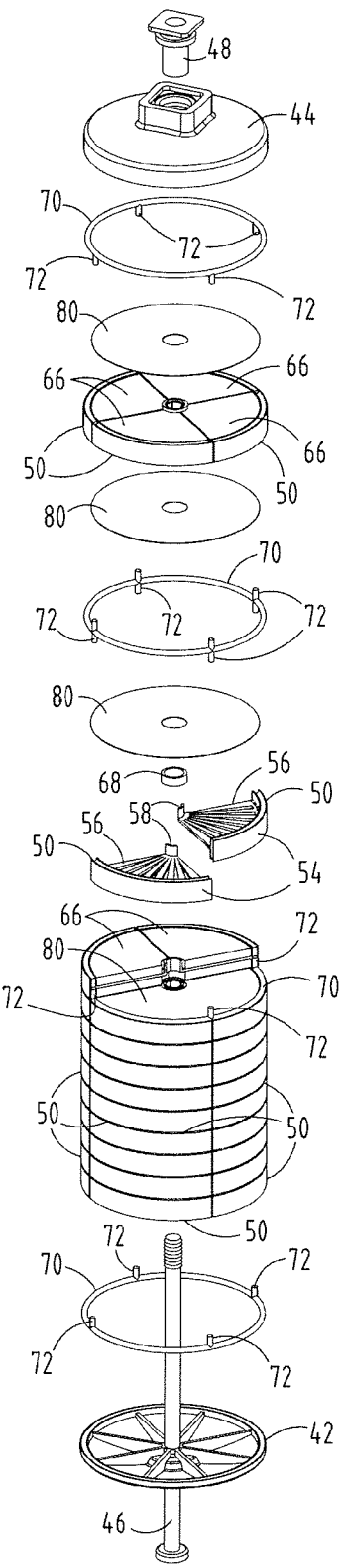
FIG. 5 is a partial exploded view of the hydrogen generator cartridge further illustrating the stack of thermal conductors and fuel pellets.
Figure 6:
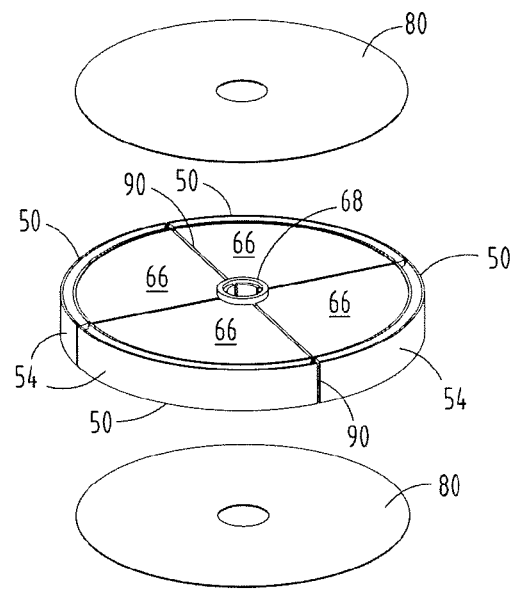
FIG. 6 is an enlarged exploded view of a portion of the cartridge showing a single layer of thermal conductors and fuel pellets.
Figure 7:
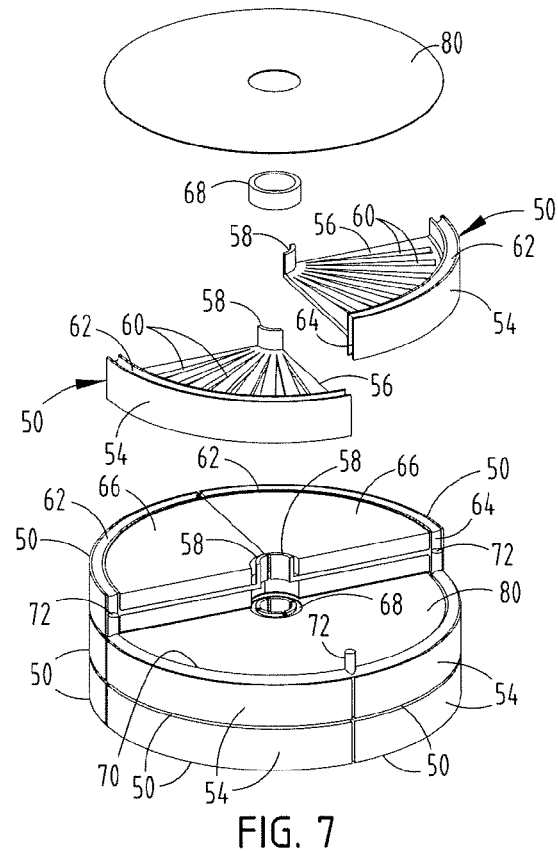
FIG. 7 is an enlarged exploded view of a portion of the cartridge.

The fuel cartridge 40 includes a plurality of thermal conductors 50, each having an outer wall assembled together with other thermal conductors 50 to form a housing in the form of a sealed casing. A plurality of fuel pellets are provided on each thermal conductor 50. Each fuel pellet includes a hydrogen-containing reactant that will react to release hydrogen gas when heated. With particular reference to FIGS. 3 and 5, the cartridge 40 is shown having a plurality of stacked thermal conductors and fuel pellets having multiple thermal conductors and fuel pellets within each row or layer, stacked one row or layer on top of another. Each thermal conductor 50 includes a curved upstanding outer wall 54, which mates together with adjoining outer walls of adjacent thermal conductors 50, and adjacent thermal conductors 50 are sealed together via a seal 70. The assembled totality of thermal conductors 50, seals 70, a bottom plate 42 and top plate 44 from a sealed housing or casing. The assembled cartridge 40 contains hydrogen-producing reactant and is sealed closed to contain the generated hydrogen.

Figure 8:
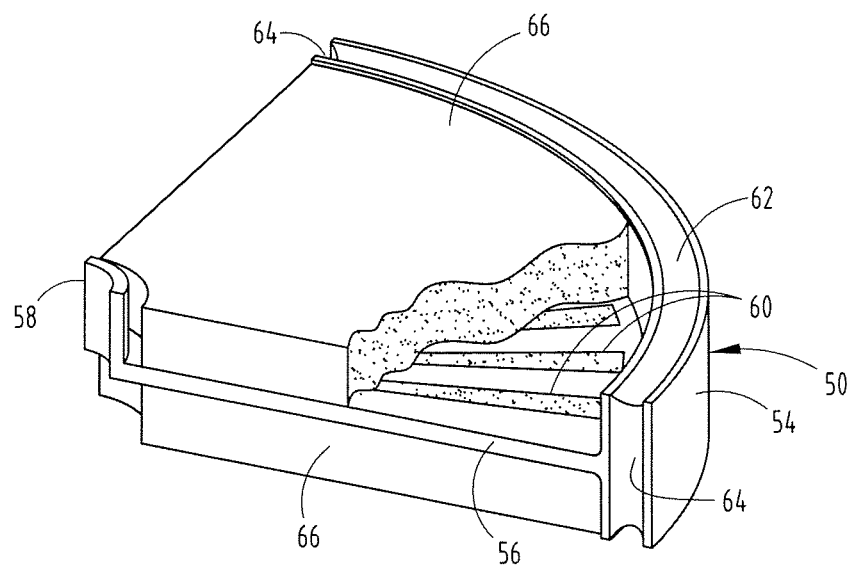
FIG. 8 is a perspective partial cut-away view of a single unused thermal conductor having a fuel pellet press fit thereon.
Figure 9:
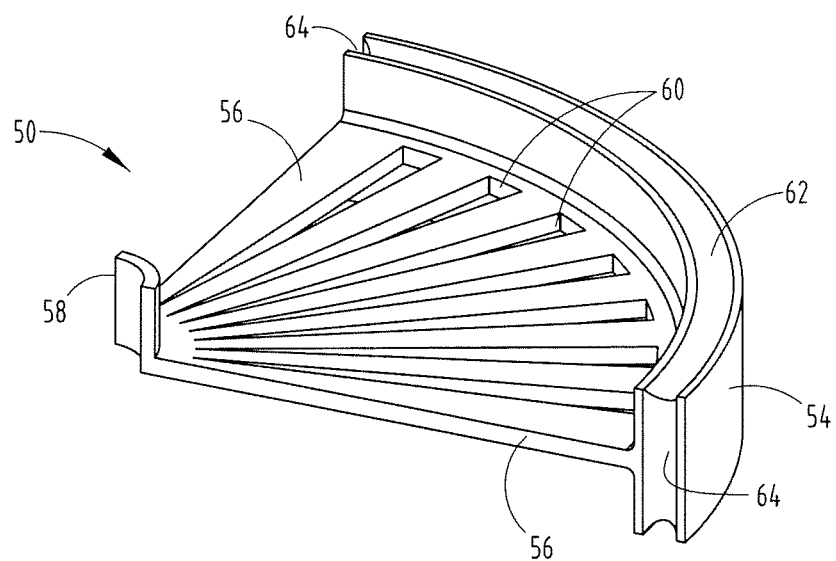
FIG. 9 is a perspective view of the thermal conductor absent the fuel pellet.

Each thermal conductor 50 also includes a plate 56 extending perpendicular from the outer wall 54 radially inward to an upstanding inner wall 58. A fuel pellet 66 containing hydrogen-containing reactant is press fit onto each thermal conductor 50, particularly onto both sides of plate 56 as seen in FIG. 8. The thermal conductor 50 includes a fan-like arrangement of openings 60, which allow the press fit reactant 66 to extend through the opening 60. As such, the fuel pellet 66 is bonded to both top and bottom sides of plate 56 and connected therebetween through openings 60. Heat applied to the outer surface of upstanding outer wall 54 efficiently passes through plate 56 to heat the reactant fuel pellet 66 centrally on both sides substantially uniformly to generate hydrogen.

The individual thermal conductors 50 may be assembled one adjacent to another within the same row and one row on top of another, as shown in FIG. 5. In doing so, the bottom plate 42 forms a bottom surface onto which a seal 70 is disposed about the peripheral edge. Each seal 70 includes a plurality of upstanding pegs 72, which extend longitudinally relative to the fuel cartridge 40. The pegs 72 are disposed between adjacent thermal conductors 50 within the same row or layer to provide a seal between the thermal conductors 50. The cartridge 40 also includes a top lid 44, which is disposed into the top layer of thermal conductors 50 via a seal 70 having pegs 72. The gas outlet valve 48 is disposed within top lid 44 and includes internal threading to receive a fastener, such as a bolt 46, which holds the cartridge assembly together. Each layer of thermal conductors 50 is disposed one layer stacked on top of the other layer with a seal 70 disposed between adjacent layers. Seal 70 fits within a recess or channel 62 of thermal conductors 50 to provide a sealed closure. Seals 70 may include upward extending and downward extending pegs 72 as shown. Adjacent longitudinally extending pegs 72 of seal 70, fit within the vertical recess 64 between adjacent thermal conductors 50 within a given row. As such, the seal 70 provides a gas-tight seal between adjoining layers of stacked thermal conductors 50 and between individual thermal conductors 50 within the same layer.

The thermal conductors 50 are held together within a given layer by a ring or tube 68, which engages the inner upstanding inner wall 58 of all thermal conductors 50 within a given layer. As such, ring 68 performs a tension function to prevent radial movement of the thermal conductors 50 due to internal pressure. The ring 68 takes the hoop stress of the gas pressure and does not elongate under load. As the internal pressure is trying to push the four quadrants of each layer in the cartridge outward, the ring 68 holds the segments together in opposition against the gas pressure and against the pressure generated by the short legs on the compressed seals. The ring 68 may be a short length of steel tube, according to one embodiment. According to another embodiment, the ring 68 is made of a thermally insulated material, such as fiberglass, having a low thermal conductivity, so as to prevent or limit thermal transfer of heat from one thermal conductor 50 to another.

Within each layer of thermal conductors 50, a space 90 is provided between adjacent thermal conductors 50. The space 90 provides thermal isolation between adjacent thermal conductors 50 so as to allow for activation of a single reactant fuel pellet, one at a time, without igniting an adjacent pellet. The space 90 may be greater than 1 mm, such as 1.5 mm, according to one example. Additionally, thermal insulation may be disposed within the space 90 between the adjacent thermal conductors 50 to provide enhanced thermal insulation therebetween.

Each layer of thermal conductors 50 is separated from adjacent layers via a disc-shaped insulator 80. The insulator 80 may include fiberglass felt or other thermal insulation. Insulator 80 provides thermal isolation between adjacent layers of the fuel pellets so as to prevent ignition of fuel pellets above or below a given activated fuel pellet.

In operation, the cartridge 40 is disposed within compartment 22 and one or more heating elements 30 are activated so as to heat one or more fuel pellets at a time. The hydrogen-containing reactant will release hydrogen gas when heated to a sufficient temperature, such as 160 degrees Celsius to 200 degrees Celsius. The controller may control activation of one or more heating elements at a time so as to supply heat to one or more thermal conductors 50, which in turn heats the reactant provided thereon. When a fuel pellet is heated, hydrogen gas is generated. A byproduct, such as ash, may remain within the compartment 22, while hydrogen gas is allowed to pass through a gas flow path and exit the gas outlet valve 48 for supply to a hydrogen-consuming device, such as a fuel cell. It should be appreciated that adjacent fuel pellets may be heated at the same time, or remotely located pellets may be heated at the same time so as to isolate the thermal heat generated within the cartridge 40.

Once a cartridge 40 is fully consumed, a user may remove the cartridge 40 from compartment 22 and may replace the cartridge 40 with a new fresh cartridge 40. In addition, the cartridge 40 may be disassembled and the thermal conductors 50 and fuel pellets may be replaced with a fresh set of thermal conductors 50 and fuel pellets. This may be achieved by unfastening fastener 46 to disassemble plates 42 and 44. The individual thermal conductors 50 having fuel pellets that are consumed may be thrown away or recycled. The new thermal conductors 50 with a fresh supply of fuel pellets may be assembled together as a unit with the seals 70 and rings 68 by properly orienting the thermal conductors 50, and the fastener 46 may be assembled to fasten together a new cartridge 40 for insertion into compartment 22.

The hydrogen generator 20 may be provided as a disposable generator intended to be disposed of once the reactant has been consumed, according to one embodiment. According to another embodiment, the hydrogen generator 30 may be reusable such that the byproduct may be removed from the housing 32 and replaced by a fresh solid thermal conductor and fuel pellets.

Accordingly, the hydrogen generator 30 advantageously generates hydrogen gas for use by a hydrogen consuming battery, such as a fuel cell or fuel stack. The hydrogen generator 20 provides for an easy to control reaction of reactants on a flexible feed member by controlling heating elements.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the Doctrine of Equivalents.

The invention claimed is:

1. A hydrogen generator comprising:
    a cartridge comprising:
        a plurality of thermal conductors each having an outer wall assembled together to form a housing;
        each thermal conductor having one or more openings;
        a plurality of fuel pellets provided on the plurality of thermal conductors, each fuel pellet comprising a hydrogen-containing reactant that will react to release hydrogen gas when heated;
    a compartment configured to removably contain the cartridge; and,
    a heating system comprising a plurality of heating elements disposed in the compartment such that each heating element is in thermal communication with one of the thermal conductors when the cartridge is disposed within the compartment to generate heat to selectively heat one or more fuel pellets to initiate a reaction to produce hydrogen gas wherein each of the fuel pellets are provided with a first portion and a second portion on opposing sides of one of the thermal conductors with a third portion passing through at least one of the at least one holes in the thermal conductor and connecting the first portion and the second portion.

2. The hydrogen generator of claim 1, wherein each thermal conductor further comprises a radial extending member in thermal communication with the outer wall.

3. The hydrogen generator of claim 1, wherein the cartridge further comprises one or more seals disposed between adjacent thermal conductors.

4. The hydrogen generator of claim 1, wherein the cartridge further comprises an insulation layer disposed between adjacent fuel pellets.

5. The hydrogen generator of claim 1, wherein the cartridge further comprises a hydrogen outlet valve in the housing and a hydrogen flow path from each fuel pellet to a hydrogen outlet path.

6. The hydrogen generator of claim 1, wherein the cartridge further comprises a bottom end and a top end sealed to the plurality of thermal conductors.

7. The hydrogen generator of claim 1, wherein the heating elements comprise electric heating elements.

8. The hydrogen generator of claim 1 further comprising a controller for controlling actuation of the heating system to selectively heat one or more fuel pellets at a time.

9. The hydrogen generator of claim 1, wherein the compartment comprises a side wall, wherein the plurality of heating elements are disposed on an inside surface of the side wall.

10. The hydrogen generator of claim 9, wherein the side wall is cylindrical and the cartridge has an outer cylindrical wall.

11. The hydrogen generator of any of claim 1, wherein the cartridge is configured to be disassembled to remove the plurality of thermal conductors when the plurality of fuel pellets have been consumed and to be reassembled with a plurality of thermal conductors having a fresh plurality of fuel pellets.

12. The hydrogen generator of claim 1, wherein the generator is adapted to be coupled to a fuel cell to supply hydrogen to the fuel cell.

13. A hydrogen generator cartridge comprising:
    a plurality of thermal conductors each having at least one hole there through and an outer wall assembled together to form a housing; and,
    a plurality of fuel pellets provided on the plurality of thermal conductors, each fuel pellet comprising a hydrogen-containing reactant that will react to release hydrogen gas when heated, each fuel pellet provided with a first portion and a second portion on opposing sides of one of the thermal conductors with a third portion passing through at least one of the at least one holes in the thermal conductor and connecting the first portion and the second portion;
    wherein the cartridge is configured to be placed in thermal communication with a heating system to selectively heat one or more fuel pellets to initiate a reaction to produce hydrogen gas.

14. A fuel cell system comprising:
    a fuel cell comprising a hydrogen gas input; and
    a hydrogen generator comprising:
        a cartridge comprising:
            a plurality of thermal conductors each having a plurality of holes there through and an outer wall assembled together to form a housing;
            a plurality of fuel pellets provided on the plurality of thermal conductors, each fuel pellet comprising a hydrogen-containing reactant that will react to release hydrogen gas when heated;
        a compartment configured to removably contain the cartridge; and,
        a heating system comprising a plurality of heating elements disposed in the compartment such that each heating element is in thermal communication with one of the thermal conductors when the cartridge is disposed within the compartment to generate heat to selectively heat one or more fuel pellets to initiate a reaction to produce hydrogen gas wherein each of the fuel pellets are provided with a first portion and a second portion on opposing sides of one of the thermal conductors with a third portion passing through at least one of the at least one holes in the thermal conductor and connecting the first portion and the second portion.

* * * * *